US012688855B2

(12) United States Patent  
Kockerbeck et al.

(10) Patent No.: US 12,688,855 B2  
(45) Date of Patent: Jul. 21, 2026

(54) SUPPLEMENTAL CONTENT OUTPUT

(71) Applicant: Amazon Technologies, Inc., Seattle, WA (US)

(72) Inventors: Mark Conrad Kockerbeck, Laguna Beach, CA (US); Song Chen, Irvine, CA (US); Aditi Srinivasan, Riverside, CA (US); Ryan Idrogo-Lam, Irvine, CA (US); Jilani Zeribi, Seattle, WA (US); John Botros, Newport Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 18/401,980

(22) Filed: Jan. 2, 2024

(65) Prior Publication Data

US 2024/0212687 A1 Jun. 27, 2024

Related U.S. Application Data

(63) Continuation of application No. 17/361,609, filed on Jun. 29, 2021, now Pat. No. 11,893,996.

(51) Int. Cl.
| | |
|---|---|
| *G10L 15/34* | (2013.01) |
| *G06F 16/632* | (2019.01) |
| *G06F 16/635* | (2019.01) |
| *G06F 16/68* | (2019.01) |
| *G10L 15/183* | (2013.01) |

(52) U.S. Cl.  
CPC ............ *G10L 15/34* (2013.01); *G06F 16/632* (2019.01); *G06F 16/635* (2019.01); *G06F 16/686* (2019.01); *G10L 15/183* (2013.01)

(58) Field of Classification Search  
USPC ..................................................... 704/1–504  
See application file for complete search history.

(56) References Cited

U.S. PATENT DOCUMENTS

| | | | | |
|---|---|---|---|---|
| 11,645,468 | B2 * | 5/2023 | Xu ......................... | G06F 40/295 |
| | | | | 704/9 |
| 11,734,326 | B2 * | 8/2023 | Miller .................... | G10L 17/06 |
| | | | | 704/200 |
| 11,741,996 | B1 * | 8/2023 | Ramesh ................. | G10L 13/02 |
| | | | | 386/285 |
| 2020/0152195 | A1 * | 5/2020 | Sarikaya ............... | G06F 40/295 |
| 2020/0342011 | A1 * | 10/2020 | Miller .................... | G10L 15/26 |
| 2022/0067289 | A1 * | 3/2022 | Xu ......................... | G06F 40/247 |
| 2024/0046932 | A1 * | 2/2024 | Opp ..................... | G10L 15/005 |
| 2024/0212687 | A1 * | 6/2024 | Kockerbeck .......... | G06F 16/635 |
| 2025/0349290 | A1 * | 11/2025 | Guo .................... | G10L 15/1822 |

* cited by examiner

*Primary Examiner* — Marcus T Riley  
(74) *Attorney, Agent, or Firm* — Pierce Atwood LLP

(57) ABSTRACT

Techniques for generating a personalization identifier that is usable by a skill to customize output of supplemental content to a user, without the skill being able to determine an identity of the user based on the personalization identifier, are described. A personalization identifier may be generated to be specific to a skill, such that different skills receive different personalization identifiers with respect to the same user. The personalization identifier may be generated by performing a one-way hash of a skill identifier, and a user profile identifier and/or a device identifier. User-perceived latency may be reduced by generating the personalization identifier at least partially in parallel to performing ASR processing and/or NLU processing.

16 Claims, 9 Drawing Sheets

FIG. 2

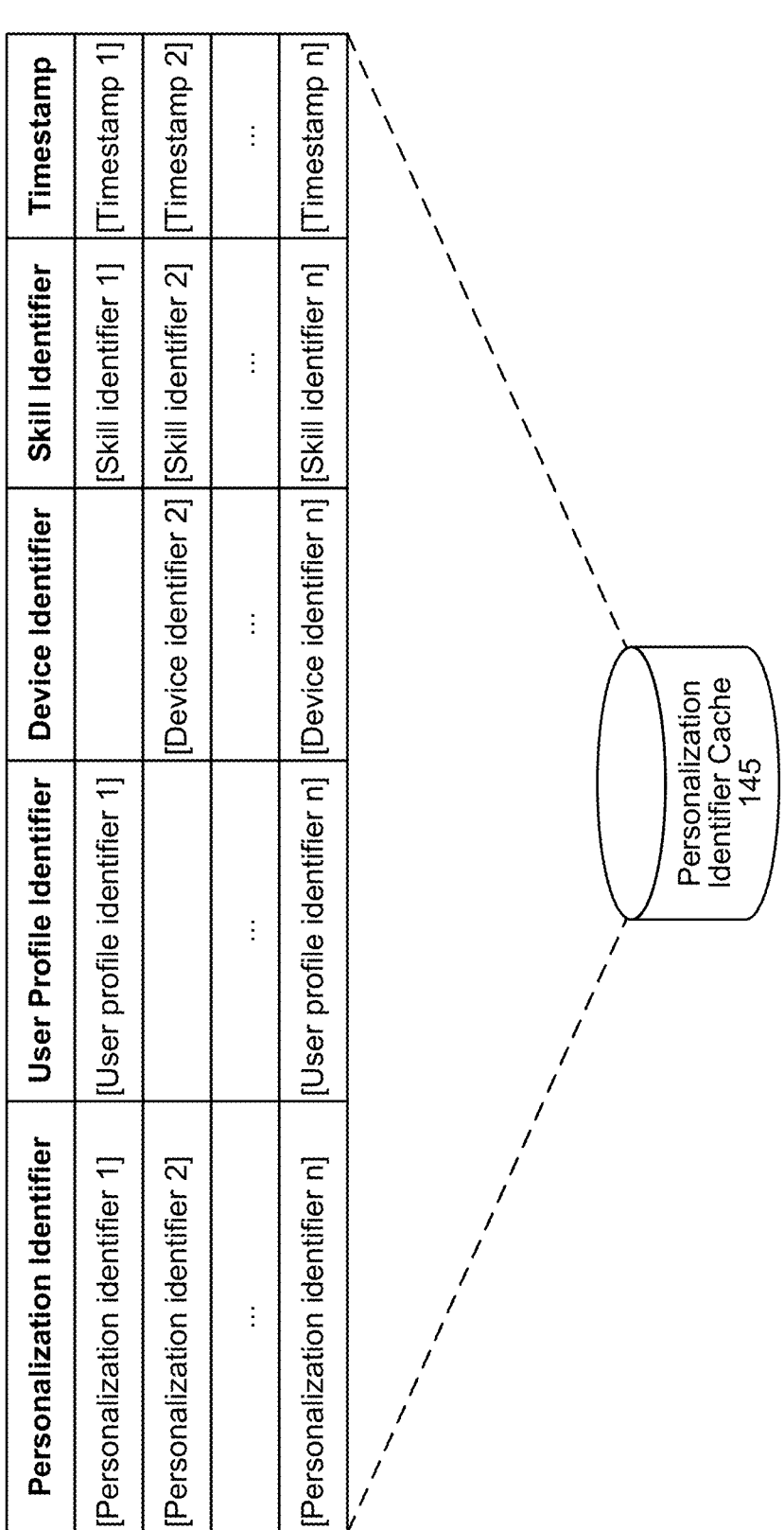

| Personalization Identifier | User Profile Identifier | Device Identifier | Skill Identifier | Timestamp |
|---|---|---|---|---|
| [Personalization identifier 1] | [User profile identifier 1] | | [Skill identifier 1] | [Timestamp 1] |
| [Personalization identifier 2] | | [Device identifier 2] | [Skill identifier 2] | [Timestamp 2] |
| ⋮ | ⋮ | ⋮ | ⋮ | ⋮ |
| [Personalization identifier n] | [User profile identifier n] | [Device identifier n] | [Skill identifier n] | [Timestamp n] |

Personalization
Identifier Cache
145

FIG. 3

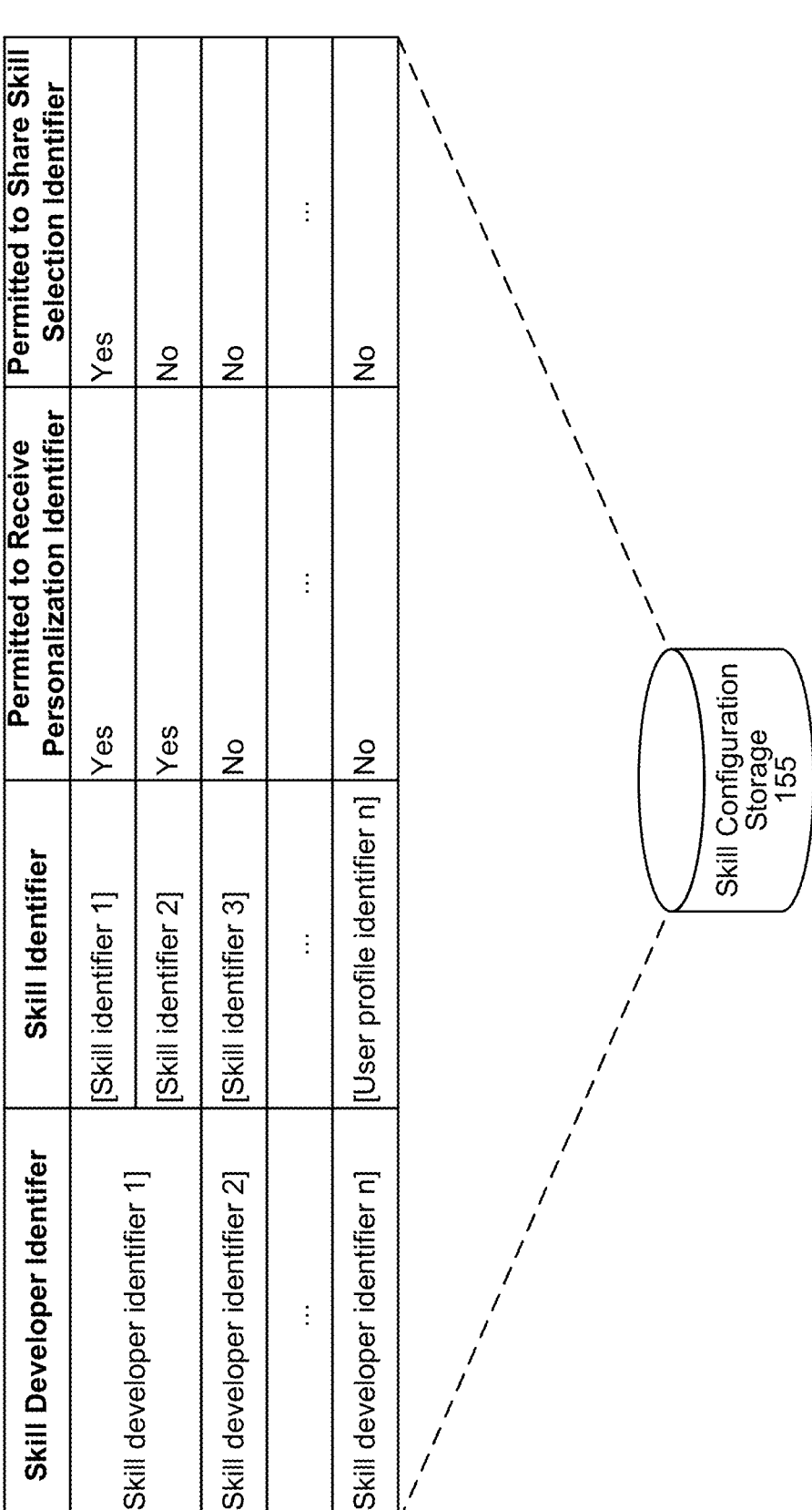

| Skill Developer Identifer | Skill Identifier | Permitted to Receive Personalization Identifier | Permitted to Share Skill Selection Identifier |
|---|---|---|---|
| [Skill developer identifier 1] | [Skill identifier 1] | Yes | Yes |
| [Skill developer identifier 2] | [Skill identifier 2] | Yes | No |
| [Skill developer identifier 3] | [Skill identifier 3] | No | No |
| ⋮ | ⋮ | ⋮ | ⋮ |
| [Skill developer identifier n] | [User profile identifier n] | No | No |

Skill Configuration Storage 155

FIG. 5

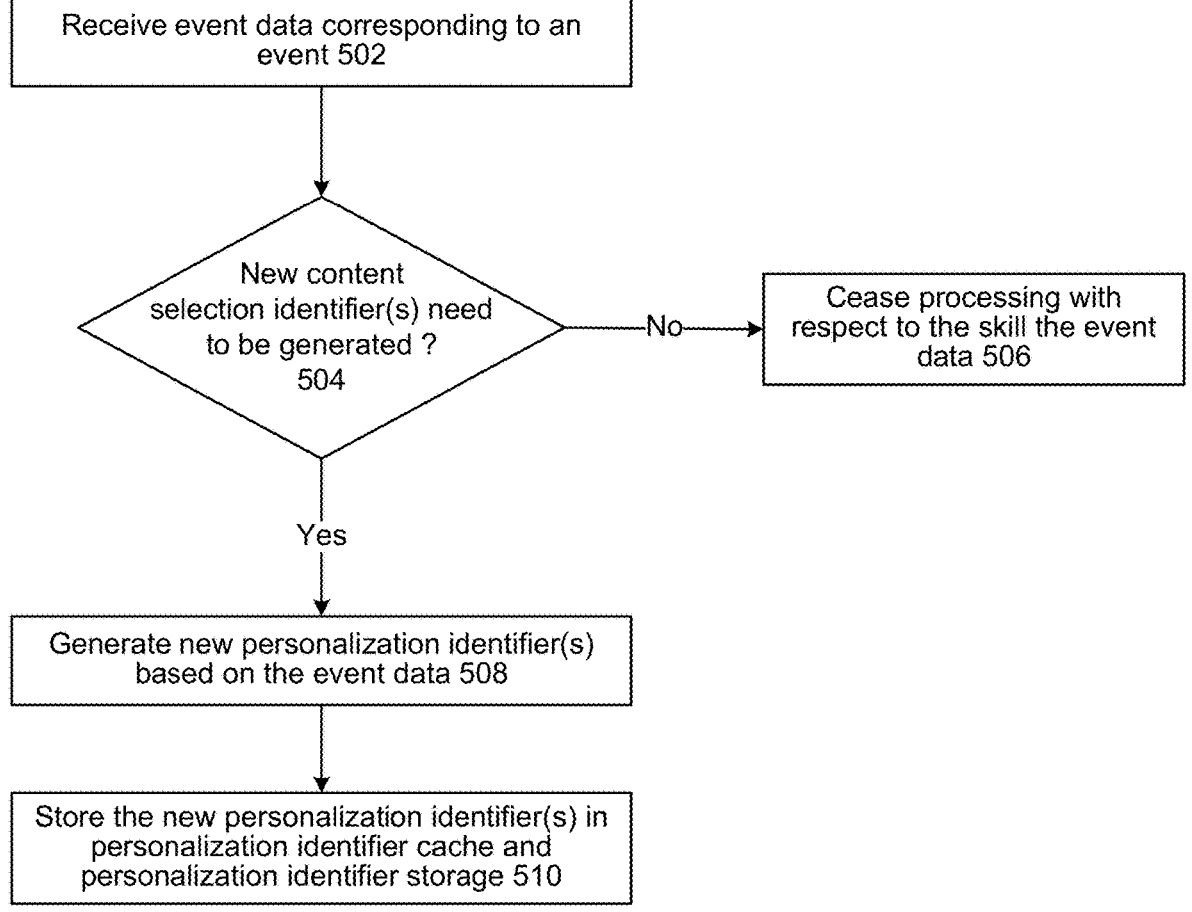

Receive event data corresponding to an event 502

New content selection identifier(s) need to be generated ? 504

No → Cease processing with respect to the skill the event data 506

Yes

Generate new personalization identifier(s) based on the event data 508

Store the new personalization identifier(s) in personalization identifier cache and personalization identifier storage 510

Network(s)
199

System(s) 120/125

Bus 824

I/O Device
Interfaces
802

Controller(s) /
Processor(s)
804

Memory
806

Storage
808

FIG. 9

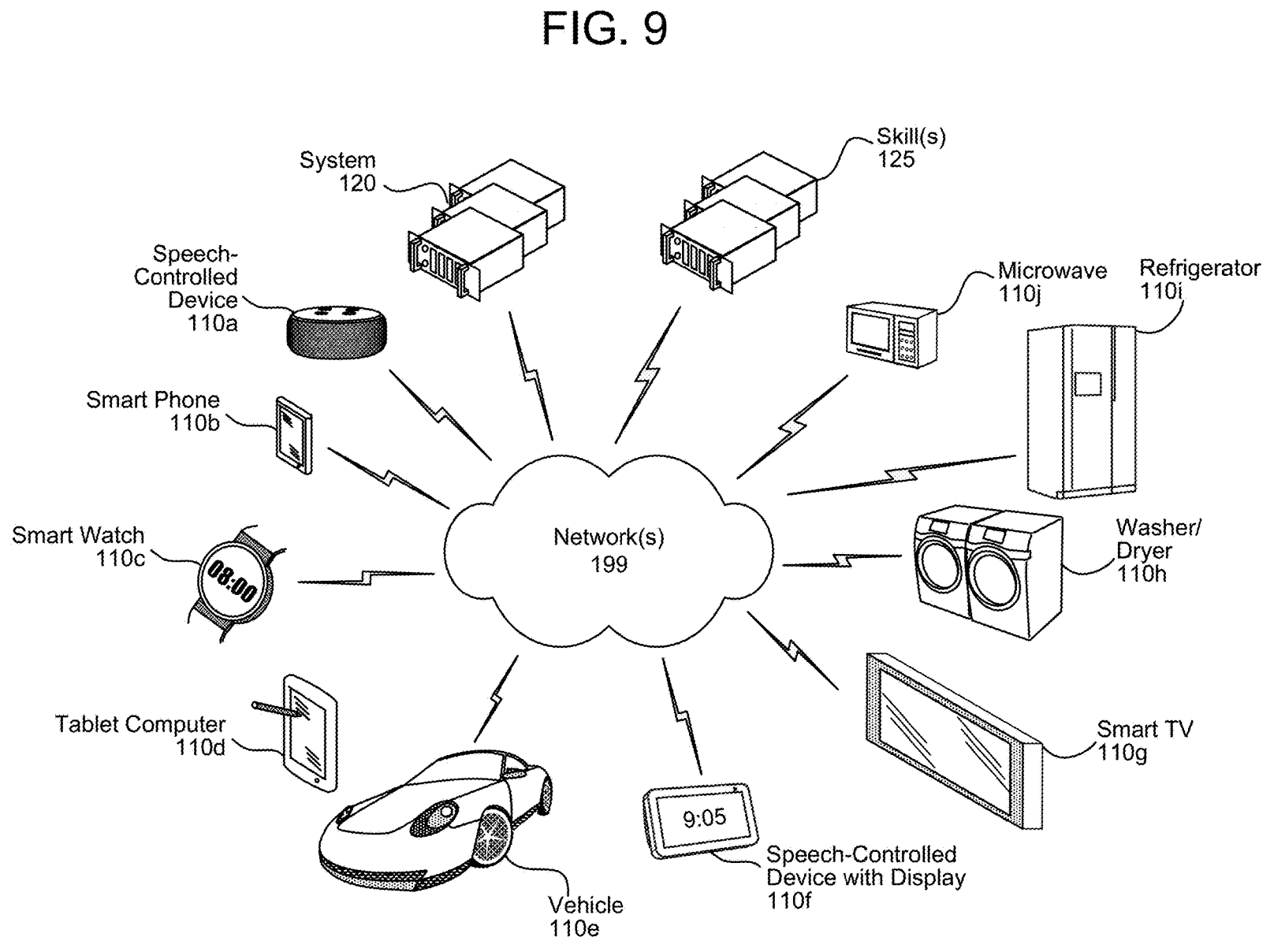

Refrigerator
110i

Washer/
Dryer
110h

Smart TV
110g

Microwave
110j

Skill(s)
125

Speech-Controlled
Device with Display
110f

System
120

Network(s)
199

Vehicle
110e

Speech-
Controlled
Device
110a

Smart Phone
110b

Smart Watch
110c

Tablet Computer
110d

9:05

08:00

SUPPLEMENTAL CONTENT OUTPUT

CROSS-REFERENCE TO RELATED APPLICATION

This application is a continuation of, and claims the benefit of priority of U.S. Non-Provisional patent application Ser. No. 17/361,609, filed Jun. 29, 2021, and entitled "SUPPLEMENTAL CONTENT OUTPUT," the content of which is incorporated herein by reference in its entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram illustrating example data that may be stored in a personalization identifier cache, according to embodiments of the present disclosure.

FIG. 3 is a conceptual diagram illustrating example data that may be stored in a skill configuration storage, according to embodiments of the present disclosure.

FIG. 5 is a process flow diagram illustrating processing that may be performed by the personalization identifier component, according to embodiments of the present disclosure.

FIG. 7 is a block diagram conceptually illustrating example components of a device, according to embodiments of the present disclosure.

FIG. 8 is a block diagram conceptually illustrating example components of a system, according to embodiments of the present disclosure.

FIG. 9 illustrates an example of a computer network for use with the overall system, according to embodiments of the present disclosure.

DETAILED DESCRIPTION

Figure 1:
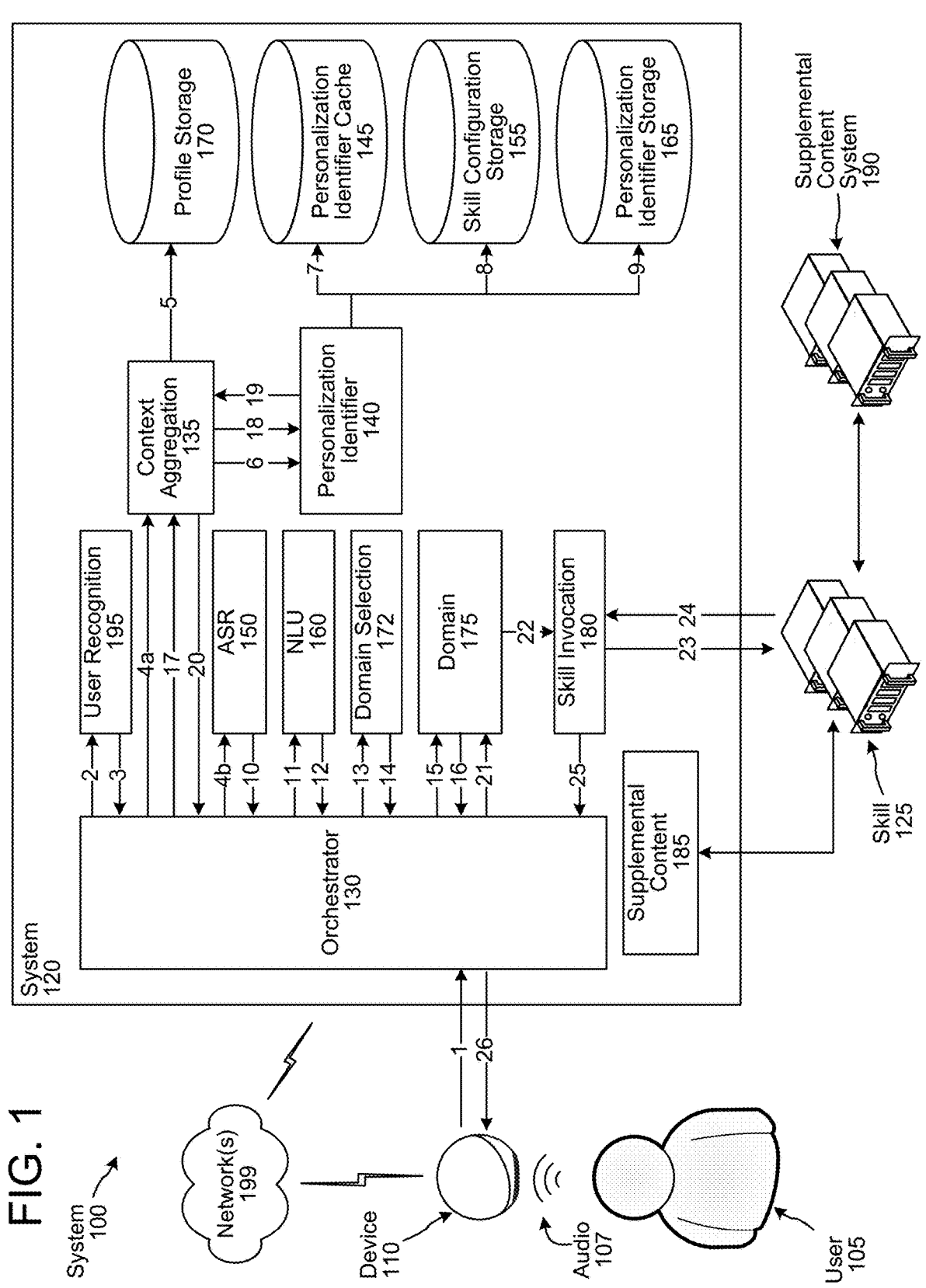
FIG. 1 is a conceptual diagram illustrating a system configured to generate and use personalization identifiers for customizing output of supplemental content, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may receive a user input (e.g., a spoken input), process the user input to determine an intent representing the user input, and invoke a skill to perform an action responsive to the user input based on the determined intent. As used herein, a "skill" may refer to software, that may be placed on a machine or a virtual machine (e.g., software that may be launched in a virtual instance when called), configured to process at least a NLU hypothesis (including an intent and optionally one or more entities), and perform one or more actions in response thereto. For example, in response to the user input "play music by [artist]," a music skill may output music sung by the indicated artist; in response to the user input "turn on the lights," a smart home skill may turn on "smart" lights associated with a user or group profile; in response to the user input "what is the weather," a weather skill may output weather information for a geographic location corresponding to the device that captured the user input; etc. In the foregoing examples, actions correspond to the outputting of music, the turning on of "smart" lights, and the outputting of weather information. A skill may operate in conjunction between various components of a system, such as user devices, restaurant electronic ordering systems, taxi electronic booking systems, etc. in order to complete certain functions. What is referred to herein as a skill may sometimes be referred to as an application, bot, or the like.

Sometimes, in addition to performing an action responsive to the user input, the skill may output supplemental content (e.g., an advertisement not being directly responsive to the user input). For example, when the system receives the user input "play music by [artist name], the skill may, prior to outputting music sung by the indicated artist, output supplemental content informing the user of pay-for functionality provided by the skill. For further example, the skill may output supplemental content indicating functionality provided by another skill, content indicating a product that may be purchased, content detailing an upcoming sporting event, etc.

The skill may store a history of supplemental content the skill has already output to a user, and the user's response to the output supplemental content, and use such history to influence the future output of supplemental content. For example, the skill may determine the skill has already output first supplemental content to the user and, in conjunction with performing an action responsive to a current user input, determine to output second supplemental content to the user.

The present disclosure provides, among other things, techniques for a system to allow a skill to customize output of supplemental content to a user, without the skill knowing the identity of the user. The system of the present disclosure is configured to generate a personalization identifier specific to a user and skill. For example, in at least some embodiments, the system may generate a personalization identifier as a one-way hash of the user's profile identifier, the skill's identifier, and a timestamp (e.g., representing a time when the personalization identifier is generated). The system may generate a different personalization identifier for each skill enabled by the user (i.e., indicated by the user as being authorized to process with respect to user inputs of the user). For example, the system may generate a first personalization identifier using the user's profile identifier, a first skill's identifier, and a first timestamp; a second personalization identifier using the user's profile identifier, a second skill's identifier, and a second timestamp; etc.

According to the present disclosure, when the system invokes a skill with respect to a user input, the system identifies (or generates if one has not been generated) a personalization identifier generated using at least the user profile identifier of the current user, the skill's identifier and a timestamp. The system sends the personalization identifier to the skill. The skill may store a history of supplemental content the skill output using the personalization identifier, and the user's response to the output supplemental content, and use such history to customize the future output of supplemental content using the personalization identifier. However, based on the personalization identifier being generated using data not shared with the skill (i.e., the user's profile identifier and the timestamp), the skill is unable to know the exact identity of the user.

The teachings of the present disclosure provide an improved user experience by enabling a skill to customize output of supplemental content to a user. The teachings of the present disclosure also increase user privacy by configuring such customized output using a unique personalization identifier for a user but which cannot be used by the skill to identify the specific user.

In at least some embodiments, a user may provide a user input requesting one, some, or all of the user's personalization identifiers be reset. In response to such a user input, the system may generate one or more new personalization identifiers, where each new personalization identifier is generated using the user's profile identifier, a skill identifier, and a timestamp corresponding to receipt of the user input requesting the reset. Thereafter, the system may send the new personalization identifier to a skill, and not the previously used personalization identifier.

The system may be configured to not indicate, to a skill, when a new personalization identifier is generated. From a skill's perspective, all the skill knows is that the skill has received a personalization identifier the skill has not received before. Thus, although original and new personalization identifiers may be generated using a same user profile identifier and a same skill identifier, it is difficult, if not impossible, for the skill (corresponding to the skill identifier used to generate both the original and new personalization identifiers) to associate the original and new personalization identifiers.

The foregoing provides an improved user experience that results in increased user privacy as personalizing recommendations based on the user's behavior may not be tied to permanent user-identifying data (e.g., a user profile identifier, user demographic and other user profile data, or device identifier, such as a device serial number).

At least some embodiments of the present disclosure relate to processing techniques that allow the system to generate a personalization identifier while introducing minimal user-perceived latency. For example, when the system receives a user input, the system may generate the personalization identifier at least partially in parallel to performing ASR processing and/or NLU processing of the user input. By parallelizing such processing, the system is able to provide the personalization identifier when the skill requests it, rather than starting generation of the personalization identifier when the skill requests the same.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to generate and use personalization identifiers for customizing output of supplemental content. Although the figures and discussion of the present disclosure illustrate certain steps in a particular order, the steps described may be performed in a different order (as well as certain steps removed or added) without departing from the present disclosure.

As shown in FIG. 1, the system 100 may include a device 110 (local to a user 105) in communication with a system 120 across a network(s) 199. The network 199 may include the Internet and/or any other wide- or local-area network, and may include wired, wireless, and/or cellular network hardware.

In some examples, the user 105 may speak an input, and the device 110 may capture audio 107 representing the spoken input. In other examples, the user 105 may provide another type of input (e.g., typed natural language input, selection of a button, selection of one or more displayed graphical interface elements, performance of a gesture, etc.). The device 110 may send (step 1) audio data (or other type of input data, such as, image data, text data, etc.) corresponding to the user input to the system 120 for processing. An orchestrator component 130, of the system 120, may receive the input data from the device 110. The orchestrator component 130 may be configured to coordinate data transmissions between components of the system 120.

Upon receiving the input data, the orchestrator component 130 may call (step 2) a user recognition component 195, of the system 120, to determine an identity of the user 105. The user recognition component 195 may recognize the user 105 using various data and one or more user recognition techniques. The user recognition component 195 may take as input audio data representing the user input, when the user input is a spoken user input. The user recognition component 195 may perform user recognition by comparing speech characteristics, in the audio data, to stored speech characteristics of users associated with the device 110 (e.g., users having user profiles associated with and/or indicating the device 110). The user recognition component 195 may additionally or alternatively perform user recognition by comparing biometric data (e.g., fingerprint data, iris data, retina data, etc.), received by the system 120 in correlation with the user input, to stored biometric data of users associated with the device 110. The user recognition component 195 may additionally or alternatively perform user recognition by comparing image data (e.g., including a representation of at least a feature of the user 105), received by the system 120 in correlation with the user input, with stored image data including representations of features of different users associated with the device 110. The user recognition component 195 may perform other or additional user recognition processes, including those known in the art.

The user recognition component 195 determines whether the user input originated from a particular user. For example, the user recognition component 195 may determine a first value representing a likelihood that the user input originated from a first user associated with the device 110, a second value representing a likelihood that the user input originated from a second user associated with the device 110, etc. The user recognition component 195 may also determine an overall confidence regarding the accuracy of user recognition processing. The user recognition component 195 may send (step 3), to the orchestrator component 130, a single user profile identifier corresponding to the most likely user that originated the user input, or multiple user profile identifiers (e.g., in the form of an N-best list) with respective values representing likelihoods of respective users originating the user input.

Figure 6:
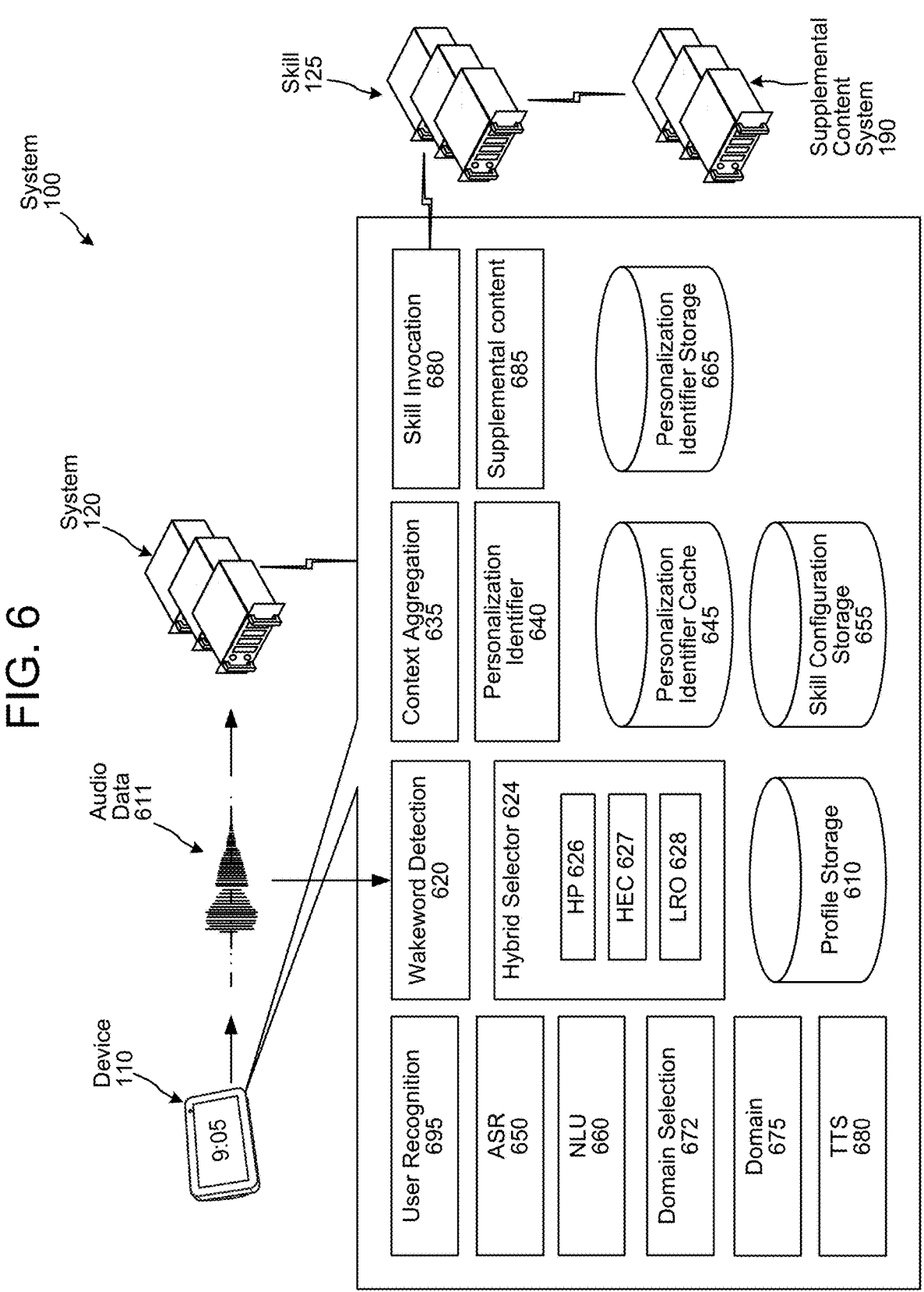
FIG. 6 is a conceptual diagram of components of a device, according to embodiments of the present disclosure.

In some embodiments, the device 110 may be configured with a user recognition component 695 (illustrated in and described with respect to FIG. 6). In such embodiments, the user recognition component 695 may process in a similar manner to that described above with respect to the user recognition component 195. In such instances, the device 110 may send the user profile identifier(s), output by the user recognition component 695, to the orchestrator component 130 in conjunction with sending the input data at the step 1 (corresponding to the user input) to the orchestrator component 130.

The orchestrator component 130 calls (step 4a) a context aggregation component 135, of the system 120, to identify and/or generate one or more personalization identifiers with respect to the user identifier (or top-scoring user identifier) determined by the user recognition component 195/695. When calling the context aggregation component 135, the orchestrator component 130 may send, to the context aggregation component 135, the user identifier (or top-scoring user identifier) determined by the user recognition component 195/695. Additionally or alternatively (e.g., in the situation where the user recognition component 195/695 is not able to determine a user profile identifier with at least a threshold confidence), the orchestrator component 130 may send, to the context aggregation component 135, a device identifier corresponding to the device 110. By configuring the orchestrator component 130 to call (step 4a) the context aggregation component 135 upon receiving the input data (at step 1) and/or the user identifier(s) from the user recognition component 195, a personalization identifier for a skill 125, that will process with respect to the user input, may be generated prior to the skill 125 needing the personalization identifier, thereby reducing user-perceived latency due to processing to generate the personalization identifier.

In response to receiving the call from the orchestrator component 130 at step 4a, the context aggregation component 135 may determine various user-specific data from one or more storages. In at least some embodiments, the context aggregation component 135 may query (step 5) a profile storage 170 for the various user-specific data.

The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; user demographic information; input and output capabilities of one or more devices; internet connectivity data; subscription data; skill enablement data; and/or other data.

The profile storage 170 may include one or more user profiles. Each user profile may be associated with a different user profile identifier. Each user profile may include various user identifying data (e.g., name, gender, address, language(s), etc.). Each user profile may also include preferences of the user. Each user profile may include one or more device identifiers (e.g., device serial numbers), each representing a respective device registered to the user. Each user profile may include skill identifiers of skills that the user has enabled. When a user enables a skill, the user is providing the system 120 with permission to allow the skill to execute with respect to the user's user inputs. Each user profile may include resources (e.g., contacts of a contact list, names of song playlists, etc.) of the user corresponding to the user profile.

The profile storage 170 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. In another example, a group profile may be a vehicle profile associated with multiple users of the vehicle. Various other types of group profiles are within the scope of the present disclosure. The present disclosure envisions any type of group profile corresponding to an environment and two or more users. A group profile may be associated with (or include) one or more device profiles corresponding to one or more devices associated with the group profile.

The profile storage 170 may include one or more device profiles. Each device profile may be associated with a different device identifier (e.g., device serial number). A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The context aggregation component 135 may query (step 5) the profile storage 170 for user-specific data that may be used to generate one or more personalization identifiers. The context aggregation component 135 may query the profile storage 170 for skill identifiers corresponding to skills indicated as being enabled in a user profile associated with the user profile identifier received from the orchestrator component 130 (at step 4a). The context aggregation component 135 may additionally or alternatively query the profile storage 170 for skill identifiers corresponding to skills indicated as being enabled in user profiles associated with a device profile corresponding to the device identifier (of the device 110) received from the orchestrator component 130 (at step 4a).

The context aggregation component 135 may additionally or alternatively query the profile storage 170 for one or more user preferences associated with the user profile identifier and/or device identifier, where such a user preference indicates some parameter for controlling output of supplemental content to the user 5. For example, a user preference may indicate when (e.g., time(s) of day, day(s) of week, etc.) supplemental content may or should not be output to the user 5 and/or using the device 110. For further example, a user preference may indicate how (e.g., as synthesized speech, displayed text, etc.) supplemental content may or should not be output to the user 5 and/or using the device 110. In another example, a user preference may indicate a particular skill is not to output supplemental content to the user 5 and/or using the device 110. For further example, a user preference may indicate that a particular skill is permitted to output supplemental content to the user 5 and/or using the device 110, but that a personalization identifier is not to be sent to the skill (thereby preventing the skill from tracking behavior of the user 105 with respect to output supplemental content). Other user preferences for controlling output of supplemental content exist, and are within the scope of the present disclosure.

The context aggregation component 135 may additionally or alternatively query the profile storage 170 for a timestamp representing when the user 105 most recently requested a reset of the user's personalization identifier(s).

The context aggregation component 135 may additionally or alternatively query the profile storage 170 for location data (e.g., country, state, city, etc.) associated with the user profile identifier and/or device identifier received from the orchestrator component 130 (at step 4a). Such may be used for determining whether a personalization identifier is to be generated, as a location (e.g., country, state, city, etc.) may have a law or other rule that prohibits tracking of user behavior with respect to output supplemental content. When the location data (received from the profile storage 170) corresponds to a location having such a law or other rule, the system 120 may be configured to not generate personalization identifiers, as described further below.

While FIG. 1 shows the context aggregation component 135 querying the profile storage 170 for various user-specific data, the system 120 may alternatively be configured where the context aggregation component 135 queries different storages for different user-specific data (e.g., a first storage for enabled skill identifiers, a second storage for user preferences, a third storage for a timestamp representing when the user 105 most recently requested a reset of the user's personalization identifier(s), a fourth storage for location data, etc.).

The context aggregation component 135 may send (step 6), to a personalization identifier component 140, the user profile identifier (the context aggregation component 135 received from the orchestrator component 130 at step 4a), the device identifier (the context aggregation component 135 received from the orchestrator component 130 at step 4a), the enabled skill identifiers, the user preferences, the timestamp representing when the user 105 most recently requested a reset of the user's personalization identifier(s), the location data, and any other user-specific data determined by the context aggregation component.

In response to receiving the user profile identifier, the device identifier, and the user-specific data determined by the context aggregation component 135, the personalization identifier component 140 may identify and/or generate one or more personalization identifiers. The personalization identifier component 140 may communicate with one or more storages (e.g., one or more lookup tables) in order to determine additional data (for generating personalization identifiers) based on the data received from the context aggregation component 135.

As described in detail herein with respect to FIG. 5, the system 120 may receive a user input to generate new personalization identifiers for the user 105. As a result of the user input, the system 120 may cease sending, to skills, personalization identifiers that were generated for the user previous to receipt of the user input. The personalization identifier component 140 may communicate with a personalization identifier cache 145 that stores the presently usable personalization identifiers for various users of the system 120.

As illustrated in FIG. 2, a personalization identifier may be associated with various data it is generated using. For example, a personalization identifier (represented as [Personalization identifier 1] in FIG. 2) may be generated using (and thus associated with in the personalization identifier cache 145) a user profile identifier (represented as [User profile identifier 1] in FIG. 2), a skill identifier (represented as [Skill identifier 1] in FIG. 2), and a timestamp (represented as [Timestamp 1] in FIG. 2). In situations where the user recognition component 195/695 is unable to determine an identity of the user 105, for example, a personalization identifier (represented as [Personalization identifier 2] in FIG. 2) may be generated using (and thus associated with in the personalization identifier cache 145) a device identifier (represented as [Device identifier 2] in FIG. 2), a skill identifier (represented as [Skill identifier 2] in FIG. 2), and a timestamp (represented as [Timestamp 2] in FIG. 2). As yet a further example, a personalization identifier (represented as [Personalization identifier n] in FIG. 2) may be generated using (and thus associated with in the personalization identifier cache 145) a user profile identifier (represented as [User profile identifier n] in FIG. 2), a device identifier (represented as [Device identifier n] in FIG. 2), a skill identifier (represented as [Skill identifier n] in FIG. 2), and a timestamp (represented as [Timestamp n] in FIG. 2).

In some embodiments, a personalization identifier may be generated using user profile data in addition to or instead of using a user profile identifier. Examples of such user profile data that may be used include, but are not limited to, user age, user gender, user geographic location, and other user demographic information. It will thus be appreciated that anytime the present disclosure mentions a personalization identifier being generated using a user profile identifier, that the personalization identifier may be generated using various user profile data in addition to or instead of the user profile identifier.

In some embodiments, a personalization identifier may be generated using device profile data in addition to or instead of using a device identifier. Examples of such device profile data that may be used include, but are not limited to, device name, device geographic location, device input capabilities, device output capabilities, and other device information. It will thus be appreciated that anytime the present disclosure mentions a personalization identifier being generated using a device identifier, that the personalization identifier may be generated using various device profile data in addition to or instead of the device identifier.

In view of the foregoing, it will be appreciated that a personalization identifier may be generated using user-specific data (e.g., user profile identifier and/or user profile data), device-specific data (e.g., device identifier and/or device profile data), a time of day (e.g., a timestamp), and a skill identifier.

The personalization identifier component 140 may also communicate with a skill configuration storage 155 that stores various skill-based data. As illustrated in FIG. 3, a skill developer identifier may be associated with one or more skill identifiers, where each skill identifier represents a skill configurable by a skill developer corresponding to the skill developer identifier. Each skill developer identifier, and by extension each skill identifier associated with the skill developer identifier, may be associated with data representing whether a skill of the skill developer are permitted to receive a skill selection identifier. In addition, each skill developer identifier, and by extension each skill identifier associated with the skill developer identifier, may be associated with data representing whether a skill of the skill developer is permitted to share a received skill selection identifier (e.g., with another skill corresponding to the same skill developer, with one or more supplemental content sources, etc.).

In some embodiments, an entity (e.g., a business entity) may have various skill developers that create various skills for the entity. The skill configuration storage 155 may store data such that an identifier of the entity may be associated with each skill generated by a skill developer of the entity. In some embodiments, when generating a personalization identifier for a skill of the entity, the personalization identifier may be generated using the entity identifier instead of the skill identifier. As such, a user may have a single personalization identifier for all skills of an entity.

The personalization identifier component 140 may additionally communicate with a personalization identifier storage 165. The personalization identifier storage 165 may store similar data to the personalization identifier cache 145. However, whereas the personalization identifier cache 145 may store personalization identifiers generated since receipt of a most recent user input requesting new personalization identifiers be generated, the personalization identifier storage 165 may store personalization identifiers generated prior to and after receipt of such a user input. Whereas the personalization identifier cache 145 may be configured to store data for rapid recall (as detailed herein below), the personalization identifier storage 165 may store data that may be used to determine what supplemental content was sent to what users (and optionally using what devices). Such may enable the system 120 to evaluate whether a skill is spamming a user of the system 120.

Figure 4:
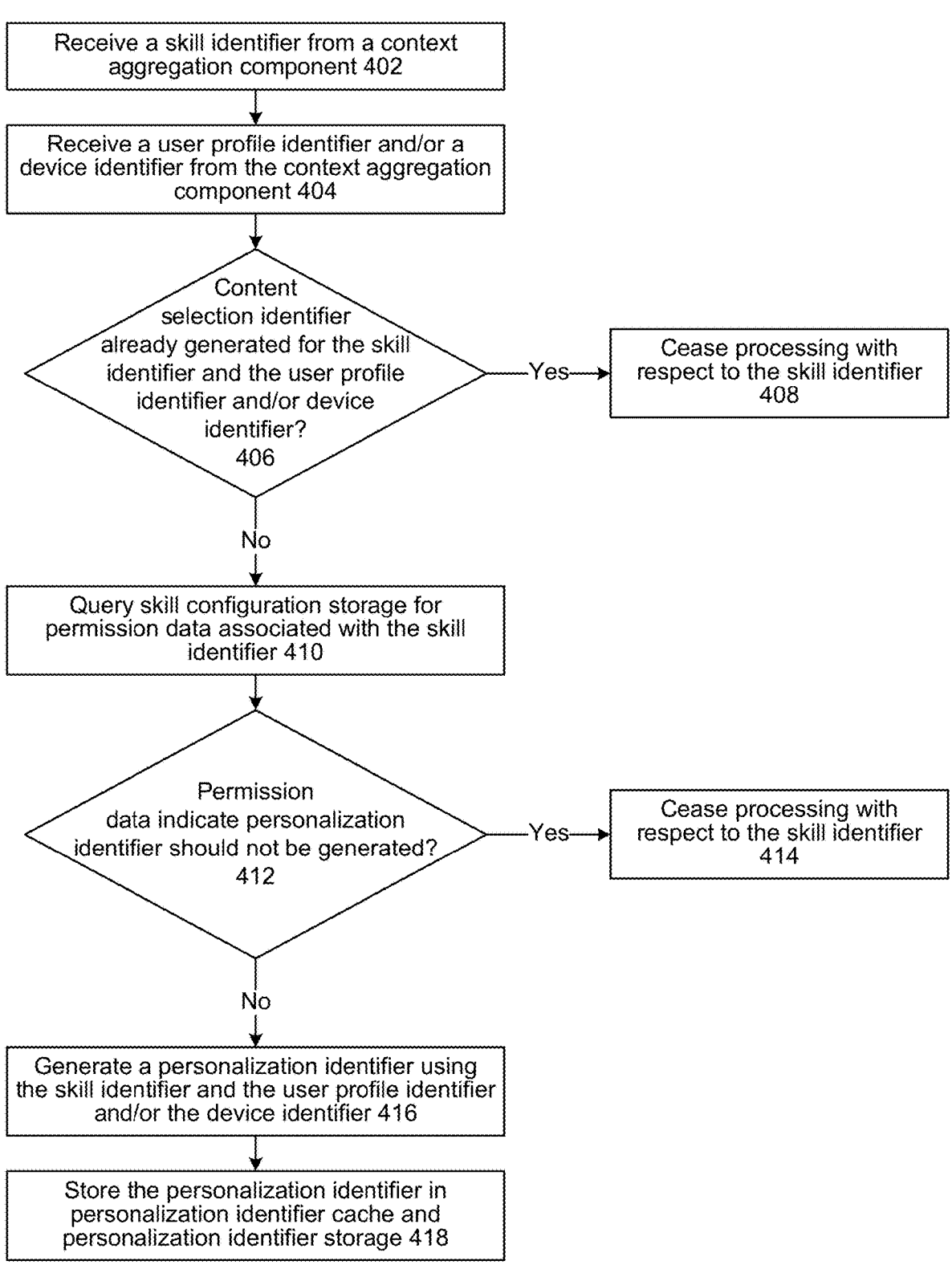
FIG. 4 is a process flow diagram illustrating processing that may be performed by a personalization identifier component, according to embodiments of the present disclosure.

The personalization identifier component 140 may perform one or more checks prior to generating a new personalization identifier. Referring to FIG. 4, the personalization identifier component 140 receives (step 402, part of step 6 in FIG. 1) a skill identifier from the context aggregation component 135. The personalization identifier component 140 also receives (step 404, part of step 6 in FIG. 1) a user profile identifier and/or a device identifier from the context aggregation component 135. The personalization identifier component 140 may determine (step 406, step 7 in FIG. 1) whether the personalization identifier cache 145 already includes a personalization identifier associated with (i.e., generated using) the skill identifier and the user profile identifier and/or device identifier. If the personalization identifier component 140 determines the personalization identifier cache 145 includes a personalization identifier associated with the skill identifier and the user profile identifier and/or the device identifier, the personalization identifier component 140 may cease (step 408) processing with respect to the skill identifier, as there is already an applicable skill selection identifier generated and ready to be sent to the skill corresponding to the skill identifier.

Conversely, if the personalization identifier component 140 determines the personalization identifier cache 145 does not include a personalization identifier associated with (i.e., generated using) the skill identifier and the user profile identifier and/or the device identifier, the personalization identifier component 140 may query (step 410, step 8 in FIG. 1) the skill configuration storage 155 for permission data associated with the skill identifier. For example, the permission data may indicate whether the skill is permitted to receive a personalization identifier, and/or whether the skill is permitted to share a received personalization identifier (e.g., with another skill corresponding to the same skill developer, with one or more supplemental content sources, etc.).

The personalization identifier component 140 determines (step 412) whether the permission data indicates a personalization identifier should not be generated for the skill. If the personalization identifier component 140 determines the permission data indicates a personalization identifier should not be generated for the skill, the personalization identifier component 140 may cease (step 414) processing with respect to the skill identifier.

Conversely, if the personalization identifier component 140 determines the permission data indicates a personalization identifier may be generated for the skill, the personalization identifier component 140 may generate (step 416) a personalization identifier using the skill identifier and the user profile identifier and/or the device profile identifier. In situations where the user recognition component 195/695 is unable to determine an identity of the user 105, the personalization identifier component 140 may receive the device identifier, but not a user profile identifier, from the context aggregation component 135. In such situations, the personalization identifier component 140 may generate the personalization identifier using the skill identifier, the device identifier, and a timestamp corresponding to generation of the personalization identifier. In instances where the personalization identifier component 140 receives the user profile identifier and the device identifier from the context aggregation component 135, the personalization identifier component 140 may generate the personalization identifier using: the skill identifier, the user profile identifier, and the timestamp; or the skill identifier, the user profile identifier, the device identifier, and the timestamp. It will be appreciated that a personalization identifier, generated using a device identifier but not a user profile identifier, may be used by a skill to customize the output of supplemental content for supplemental content output using the device 110 (regardless of the user that provided the corresponding user input). It will further be appreciated that a personalization identifier, generated using a user profile identifier but not a device identifier, may be used by a skill to customize the output or supplemental content for the user, regardless of which the device the user is interacting with. It will also be appreciated that a personalization identifier, generated using a user profile identifier and a device identifier, may be used by a skill to customize the output of supplemental content for the user based on the device the user is interacting with. Whether the personalization identifier component 140 is configured to generate the personalization identifier using a user profile identifier, a device identifier, or both a user profile identifier and a device identifier may be configurable and may be based on the data input to the personalization identifier component 140 in any given instance.

The personalization identifier component 140 may use various techniques to generate the personalization identifier. In some embodiments, the personalization identifier component 140 may input the skill identifier, the user profile identifier and/or the device identifier, and a timestamp into a one-way hash function to generate a personalization identifier having, for example, a 8-4-4-4-12 format (i.e., a XXXXXXXX-XXXX-XXXX-XXXX-XXXXXXXXXXXX format, where each "X" represents a number or letter generated using the one-way hash function).

After generating the personalization identifier, the personalization identifier component 140 may store (418, and steps 7 and 9 in FIG. 1) the personalization identifier in the personalization identifier cache 145 and the personalization identifier storage 165.

The personalization identifier component 140 may perform the processing of FIG. 4 with respect to each skill identifier received from the context aggregation component 135 at step 6 in FIG. 1.

In some embodiments, the system 120 may communicate with one or more skills having a rating satisfying (e.g., meeting or exceeding) a condition (e.g., a threshold rating). The rating of a skill may be generated based on implicit and/or explicit user feedback provided by various users of the system 120 with respect to the skill. With user permission, the personalization identifier 140 may perform the processing of FIG. 4 with respect to the one or more highly-rated skills even though one or more of the highly-rated skills may not be indicated as enabled in the user profile of the user 105 and/or the device profile if the device 110.

Referring again to FIG. 1, in addition to calling the context aggregation component 135 at step 4a, the orchestrator component 130 may send input audio data (received at step 1) to an ASR component 150. The ASR component 150 transcribes the input audio data into one or more ASR hypotheses. An ASR hypothesis may be configured as a textual interpretation of the speech of the spoken input, or may be configured in another manner, such as one or more tokens. Each ASR hypothesis may represent a different likely interpretation of the speech in the input audio data.

The ASR component 150 may interpret speech in the input audio data based on the similarity between the input audio data and language models. For example, the ASR component 150 may compare the input audio data with models for sounds (e.g., subword units or phonemes) and sequences of sounds to identify words that match the sequence of sounds in the spoken input. Alternatively, the ASR component 150 may use a finite state transducer (FST) to implement the language model functions.

When the ASR component 150 generates more than one ASR hypothesis for a single spoken input, each ASR hypothesis may be assigned a score (e.g., probability score, confidence score, etc.) representing a likelihood that the corresponding ASR hypothesis matches the spoken input (e.g., representing a likelihood that a particular set of words matches those in the spoken input). The score may be based on a number of factors including, for example, the similarity of the sound in the spoken input to models for language sounds (e.g., an acoustic model), and the likelihood that a particular word, which matches the sounds, would be included in the sentence at the specific location (e.g., using a language model). Based on the considered factors and the assigned confidence score, the ASR component 150 may output an ASR hypothesis that most likely matches the spoken input, or may output multiple ASR hypotheses in the form of a lattice or an N-best list, with each ASR hypothesis corresponding to a respective score.

The ASR component 150 may send (step 10) the one or more ASR hypotheses to the orchestrator component 130, which may send (step 11) the one or more ASR hypotheses to a NLU component 160.

The NLU component 160 processes the one or more ASR hypotheses to determine one or more NLU hypotheses. The NLU component 160 may perform intent classification (IC) processing on an ASR hypothesis to determine an intent of the user input. An intent corresponds to an action to be performed that is responsive to the user input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in the ASR hypothesis to the words and phrases in an intents database. In some embodiments, the NLU component 160 may communicate with multiple intents databases, where each intents database corresponds to one or more intents associated with a particular domain or skill.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

As used herein, a "domain" refers to a collection of related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

A group of skills, configured to provide related functionality, may be associated with a domain. For example, one or more music skills may be associated with a music domain.

The NLU component 160 may also perform named entity recognition (NER) processing on the ASR hypothesis to determine one or more entity names that are mentioned in the user input and that may be needed for post-NLU processing. For example, NER processing of the user input "play [song name]" may determine an entity type of "SongName" and an entity name of "[song name]." For further example, NER processing of the user input "call mom" may determine an entity type of "Recipient" and an entity name of "mom." In another example, NER processing of the user input "what is today's weather" may determine an entity type of "Date" and an entity name of "today."

In at least some embodiments, the intents identifiable by the NLU component 160 may be linked to one or more grammar FSTs with entity types to be populated with entity names. Each entity type of a FST may correspond to a portion of an ASR hypothesis that the NLU component 160 believes corresponds to an entity name. For example, a FST corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in an ASR hypothesis as subject, object, verb, preposition, etc. based on grammar rules and/or models. Then, the NLU component 160 may perform IC processing using the identified verb to identify an intent. Thereafter, the NLU component 160 may again perform NER processing to determine a FST associated with the identified intent. For example, a FST for a <PlayMusic> intent may specify a list of entity types applicable to play the identified "object" and any object modifier (e.g., a prepositional phrase), such as {Artist Name}, {Album Name}, {Song name}, etc.

The NLU component 160 may generate one or more NLU hypotheses, where each NLU hypothesis includes an intent and optionally one or more entity types and corresponding entity names. In some embodiments, a NLU hypothesis may be associated with a score representing a confidence of NLU processing performed to determine the NLU hypothesis with which the score is associated.

As described above, the system 120 may perform speech processing using two different components (e.g., the ASR component 150 and the NLU component 160). In at least some embodiments, the system 120 may implement a spoken language understanding (SLU) component configured to process input audio data to determine one or more NLU hypotheses.

The SLU component may be functionally equivalent to a combination of the ASR component 150 and the NLU component 160. Yet, the SLU component may process input audio data and directly determine the one or more NLU hypotheses, without an intermediate step of generating one or more ASR hypotheses. As such, the SLU component may take input audio data representing speech and attempt to make a semantic interpretation of the speech. That is, the SLU component may determine a meaning associated with the speech and then implement that meaning. For example, the SLU component may interpret input audio data representing speech from the user 105 in order to derive a desired action. The SLU component may output a most likely NLU hypothesis, or multiple NLU hypotheses associated with respective confidence or other scores (such as probability scores, etc.).

The NLU component 160 (or SLU component) may send (step 12) the one or more NLU hypotheses to the orchestrator component 130, which may send the one or more NLU hypotheses to a domain selection component 172. The domain selection component 172 is configured to determine which domain the current user input most-likely corresponds to. In a simple example, the domain selection component 172 may determine the domain of the current user input based on the intent in the received (or top-scoring received) NLU hypothesis. In some examples, the domain selection component 172 may determine the domain of the current user input based on the intent and an entity type(s) represented in the received (or top-scoring received) NLU hypothesis. For example, if the domain selection component 172 determines the received (or top-scoring received) NLU hypothesis includes a <TurnOnLight> intent, the domain selection component 172 may determine the user input corresponds to a smart home domain. For further example, if the domain selection component 172 determines the received (or top-scoring received) NLU hypothesis includes a <Play> intent and a "song" entity type, the domain selection component 172 may determine the user input corresponds to a music domain. In another example, if the domain selection component 172 determines the received (or top-scoring received) NLU hypothesis includes a <Play> intent and a "video" entity type, the domain selection component 172 may determine the user input corresponds to a video domain. For further example, if the domain selection component 172 determines the received (or top-scoring received) NLU hypothesis includes an <OutputWeather> intent, the domain selection component 172 may determine the user input corresponds to a weather domain. In another example, if the domain selection component 172 determines the received (or top-scoring received) NLU hypothesis includes a <Call> intent, the domain selection component 172 may determine the user input corresponds to a communications domain. For further example, if the domain selection component 172 determines the received (or top-scoring received) NLU hypothesis includes a <Purchase> intent, the domain selection component 172 may determine the user input corresponds to a shopping domain.

The domain selection component 172 may send (step 14), to the orchestrator component 130, an indication of the domain determined by the domain selection component 172. The system 120 may include a different domain component for each domain (e.g., a single music component for the music domain, a single weather component for the weather domain, etc.). In response to receiving the indication of the domain from the domain selection component 172, the orchestrator component 130 may determine a domain component 175 corresponding to the indicated domain, and send (step 15) the one or more NLU hypotheses (output by the NLU component 160 and input to the domain selection component 172) to the domain component 175.

The domain component 175 may be associated with a group of skills configured to perform functionality corresponding to the domain. For example, a music domain component may be associated with a plurality of music skills configured to perform music-related processing, a smart home domain component may be associated with a plurality of smart home domains configured to perform smart-home related processing, etc.

The domain component 175 may be configured to select, from among the skills associated therewith, which skill is to process with respect to the current user input. For example, if a music domain receives a NLU hypothesis (or top-scoring NLU hypothesis) including a <Play> intent, an entity type of "song," and an entity name of "[song name]," the music domain may determine which, of the skills associated therewith, is able to play the indicated song.

In some embodiments, the domain component 175 may select a skill based on one or more skill preferences of the user 105, as indicated in the user's profile in the profile storage 170. For example, a smart home domain may select a first smart home skill (to process with respect to the current user input) based on the user profile, of the user 105, indicating the user 105 prefers the first smart home skill.

In some embodiments, the domain component 175 may select a skill based on a subscription of the user 105, as indicated in the user's profile in the profile storage 170. For example, a podcast domain may select a first podcast skill (to process with respect to the current user input) based on the user profile, of the user 105, indicating the user 105 has purchased a subscription to the first podcast skill. Conversely, the podcast domain may not select a second podcast skill based on the user profile not including subscription information for the second podcast skill.

In some embodiments, the domain component 175 may select a skill based on skill rating. The rating of a skill may be generated based on implicit and/or explicit user feedback provided by various users of the system 120 with respect to the skill. In some embodiments, the domain component 175 may not select a skill having a skill rating failing to satisfy (e.g., failing to meet or exceed) a condition (e.g., a threshold skill rating).

Once the domain component 175 selects a skill 125 to process with respect to the current user input, the domain component 175 may send (step 16), to the orchestrator component 130, a request for the personalization identifier associated with the skill identifier, of the selected skill, and the user profile identifier (of the user 105) and/or the device identifier of the device 110. The request may include the skill identifier and the user profile identifier and/or the device identifier. The orchestrator component 130 may send (step 17) the request to the context aggregation component 135, which may send (step 18) the request to the personalization identifier component 140.

In response to receiving the request, the personalization identifier component 140 may query the personalization identifier cache 145, rather than the personalization identifier storage 165, for a personalization identifier associated with the skill identifier and the user profile identifier and/or the device identifier. The personalization identifier component 140 may query the personalization identifier cache 145 because the cache is configured to store personalization identifiers that may presently be sent to skills, whereas the personalization identifier storage 165 is additionally configured to store personalization identifiers that are no longer permitted to be sent to skills (e.g., due to a user requesting they personalization identifiers be rest). The personalization identifier component 140 may send (step 19) the personalization identifier to the context aggregation component 135. The context aggregation component 135 may send (step 20) the personalization identifier to the orchestrator component 130, which may send (step 21) the personalization identifier to the domain component 175.

In some embodiments, the domain component 175 may request the personalization identifier directly from the personalization identifier component 140, without going through the orchestrator component 130 and the context aggregation component 135.

In some embodiments, rather than sending the request (at step 16) after the domain component 175 has selected the skill 125, the domain component 175 may, prior to selecting the skill 125, send (at step 16) a request for a respective content identifier associated with each skill identifier, associated with the domain component 175, and the user profile identifier and/or the device identifier. For example, if the domain component 175 is associated with a first skill (corresponding to a first skill identifier) and a second skill (corresponding to a second skill identifier), the domain component 175 may send (at step 16) a request for (1) a first personalization identifier associated with the first skill identifier and the user profile identifier and/or the device identifier, and (2) a second personalization identifier associated with the second skill identifier and the user profile identifier and/or the device identifier. In response, the domain component 175 may receive, from the personalization identifier component 140, a list of two or more personalization identifiers, where each personalization identifier in the list is associated with a respective skill identifier.

By calling the context aggregation component 135 (at step 4a) and sending the input audio data to the ASR component 150 (at step 4b) simultaneously or nearly simultaneously (as shown in FIG. 1), the personalization identifier component 140 may be able to generate the personalization identifier prior to the domain component 175 outputting the request at step 16. Such parallelized processing of the context aggregation component 135 and the personalization identifier component 140 with the ASR component 150, the NLU component 160, the domain selection component 172, and the domain component 175, may result in reduced user-perceived latency.

After selecting the skill 125, the domain component 175 may send (step 22), to a skill invocation component 180, the skill identifier of the skill 125, the NLU hypothesis (including an intent and optionally one or more entity types with corresponding entity names) to be processed by the skill 125, and the personalization identifier associated with the skill identifier and received from the personalization identifier 140. The skill invocation component 180 may be a component of the system 120 that acts as an interface between the system 120 and various skills. Upon receiving the data from the domain component 175 at step 22, the skill invocation component 180 may send (step 23) at least a portion of the data (e.g., the NLU hypothesis and the personalization identifier) to the skill 125 corresponding to the skill identifier received from the domain component 175.

The skill 125 may process the NLU hypothesis to determine first output data responsive to the user input (e.g., based on the intent and entity type(s) and entity name(s)

represented in the NLU hypothesis). For example, if the NLU hypothesis includes a <Play> intent, an entity type of "song," and an entity name of "[song name]," the skill 125 may determine the first output data to include a file identifier corresponding to audio data of the song. For further example, if the NLU hypothesis includes an <OutputWeather> intent, the skill 125 may determine the first output data to include natural language text or some other representation of weather information for a geographic location of the user 105/device 110. Other examples are possible, and within the knowledge of one skilled in the art.

Sending of the personalization identifier, to the skill 125, may not indicate, to the skill 125, that the skill 125 must output supplemental content. Rather, sending of the personalization identifier, to the skill 125 may simply indicate that the skill 125 may output supplemental content based on the personalization identifier if the skill 125 so chooses.

If the skill 125 determines supplemental content should be output, the skill 125 may determine the supplemental content using various sources. The skill 125 may store a repository of supplemental content. The skill 125 may select a supplemental content from the repository to output based on the received personalization identifier, one or more entity types and names in the received NLU hypothesis, and previously-selected and output supplemental content associated with the personalization identifier (if any). While the skill 125 may select the supplemental content based on the personalization identifier, and previously-selected and output supplemental content associated with the personalization identifier, how the personalization identifier is generated (as detailed herein above) may make it difficult, if not impossible, for the skill 125 to determine the identity of the user 105.

The skill 125 may additionally or alternatively communicate with a supplemental content component 185 of the system 120. The supplemental content component 185 may store a repository of supplemental content. The skill 125 may send a request for supplemental content to the supplemental content component 185, where the request includes the personalization identifier and one or more entity types and names represented in the NLU hypothesis received by the skill 125. The supplemental content component 185 may select a supplemental content from the repository based on the personalization identifier, the one or more entity types and names, and previously-selected and output supplemental content associated with the personalization identifier (if any). The supplemental content component 185 may send the selected supplemental content to the skill 125.

The skill 125 may additionally or alternatively communicate with a supplemental content system 190 implemented separate from the system 120. The supplemental content system 190 may store a repository of supplemental content. The skill 125 may send a request for supplemental content to the supplemental content system 190, where the request includes the personalization identifier and one or more entity types and names represented in the NLU hypothesis received by the skill 125. The supplemental content system 190 may select a supplemental content from the repository based on the personalization identifier, the one or more entity types and names, and previously-selected and output proactive content associated with the personalization identifier (if any). The proactive content system 190 may send the selected proactive content to the skill 125. While the proactive content system 190 may select the proactive content based on the personalization identifier, and previously-selected and output proactive content associated with the personalization identifier, how the personalization identifier is generated (as detailed herein above) may make it difficult, if not impossible, for the proactive content system 190 to determine the identity of the user 105.

The skill 125 may send (step 24), to the skill invocation component 180, first output data corresponding to a response to the user input, and second output data corresponding to the selected supplemental content. In some instances, the skill 125 may determine supplemental content should not be output, and may simply send the first output data to the skill invocation component 180. The skill invocation component 180 may send (step 25) the first output data and the second output data (if such exists) to the orchestrator component 130. The orchestrator component 130 may then send (step 26) the first output data and the second output data (if such exists) to the device 110 for output (e.g., as audio and/or displayed text). In some embodiments, the orchestrator component 130 may invoke a TTS component of the system 120 to generate output audio data including synthesized speech corresponding to the first output data and/or the second output data.

In one method of synthesis called unit selection, the TTS component matches input data against a database of recorded speech. The TTS component selects matching units of recorded speech and concatenates the units together to form audio data. In another method of synthesis called parametric synthesis, the TTS component varies parameters such as frequency, volume, and noise to determine audio data including an artificial speech waveform. Parametric synthesis uses a computerized voice generator, sometimes called a vocoder.

As illustrated in FIG. 1 and described above, the domain component 175 may request and receive the personalization identifier from the personalization identifier component 140 (directly or indirectly via the context aggregation component 135). Alternatively, in some embodiments the skill invocation component 180 may request and receive the personalization identifier from the personalization identifier component 140 (directly or indirectly via the context aggregation component 135). As another alternative, in some embodiments the skill 125 may request and receive the personalization identifier from the personalization identifier component 140 (directly or indirectly via the context aggregation component 135). Regardless of the foregoing that is implemented, user-perceived latency may be reduced by causing the personalization identifier component 140 to process at least partially in parallel to the ASR component 150, the NLU component 160, and/or the domain selection component 172.

Different components of the system 120 (other than the orchestrator component 130 as illustrated in FIG. 1) may be configured to send the call (of step 4a) to the context aggregation component 135. In some embodiments, the domain component 175 may call the context aggregation component 135 to generate (or determine already generated) personalization identifiers using the skill identifiers of the skills associated with the domain component 175, and the user profile identifier and/or the device identifier. In other embodiments, the domain component 175, the skill invocation component 180, or the skill 125 may call the context aggregation component 135 to generate (or determine an already generate) personalization identifier using the skill identifier of the skill 125 (selected by the domain component 175), and the user profile identifier and/or the device identifier.

In some embodiments, the personalization identifier component 140 may determine whether a new personalization identifier is to be generated based on the occurrence of one or more events. The personalization identifier component 140 may subscribe to an event bus of the system 120 (not illustrated) to receive events therefrom. For example, the personalization identifier component 140 may subscribe to receive skill enablement events, device registration events, and events requesting reset of a user's personalization identifiers.

As illustrated in FIG. 5, the personalization identifier component 140 may receive (step 502), from the event bus, event data corresponding to an event. In response to receiving the event data, the personalization identifier component 140 may determine (step 504) whether a new personalization identifier(s) is to be generated.

For example, if the event data indicates a user has enabled a skill, the personalization identifier component 140 may determine whether the personalization identifier cache 145 is presently storing a personalization identifier generated using (i.e., associated with) the user profile identifier of the user (as represented in the event data) and the skill identifier of the newly enabled skill (as represented in the event data). If the personalization identifier component 140 determines the personalization identifier cache 145 is presently storing the personalization identifier, the personalization identifier component 140 may cease (step 506) processing with respect to the event data. Conversely, if the personalization identifier component 140 determines the personalization identifier cache 145 is not presently storing the personalization identifier, the personalization identifier component 140 may generate (step 508) a new personalization identifier using the user profile identifier, the skill identifier, and a timestamp corresponding to a present time. The personalization identifier component 140 may then store (step 510) the personalization identifier in the personalization identifier cache 145 and the personalization identifier storage 165.

For further example, if the event data indicates a user has registered a device 110 (e.g., causing the device id of the device 110 to become associated with the user's profile identifier), the personalization identifier component 140 may determine whether the personalization identifier cache 145 is presently storing personalization identifier(s) generated using (i.e., associated with) the device identifier (as represented in the event data), and optionally the user profile identifier of the user. If the personalization identifier component 140 determines the personalization identifier cache 145 is presently storing the personalization identifier, the personalization identifier component 140 may cease (step 506) processing with respect to the event data. Conversely, if the personalization identifier component 140 determines the personalization identifier cache 145 is not presently storing a personalization identifier generated using the device identifier and optionally the user profile identifiers, the personalization identifier component 140 may generate (step 508) a new personalization identifier(s) for each enabled skill associated with the user profile identifier, where each new personalization identifier is generated using an enabled skill identifier, the device identifier (and optionally the user profile identifier), and a timestamp corresponding to a present time. The personalization identifier component 140 may then store (step 510) the personalization identifier(s) in the personalization identifier cache 145 and the personalization identifier storage 165.

In another example, if the event data indicates a user has provided a user input (e.g., a spoken input, selection of a virtual button displayed on a touchscreen of a device, etc.) requesting the user's personalization identifiers be reset, the personalization identifier component 140 may automatically determine, based on the event data corresponding to a "personalization identifier reset" event type, that the personalization identifier(s) of the user is to be newly generated. As a result, the personalization identifier component 140 may cause the personalization identifier cache 145 to delete therefrom presently stored personalization identifiers associated with (i.e., generated using) the user's profile identifier. The personalization identifier component 140 may not, however, cause the personalization identifiers (associated with the user's profile identifier) to be deleted from the personalization identifier storage 165. The personalization identifier component 140 may also generate (step 508) a new personalization identifier(s) for each enabled skill associated with the user's profile identifier, where each new personalization identifier is generated using an enabled skill identifier, the user's profile identifier (and optionally a device identifier associated with the user's profile identifier), and a timestamp corresponding to a present time. The personalization identifier component 140 may then store (step 510) the newly generated personalization identifier(s) in the personalization identifier cache 145 and the personalization identifier storage 165.

The foregoing describes illustrative components and processing of the system 120. The following describes illustrative components and processing of the device 110. As illustrated in FIG. 6, in at least some embodiments the system 120 may receive audio data 611 from the device 110, to recognize speech in the received audio data 611, and to perform functions in response to the recognized speech. In at least some embodiments, these functions involve sending directives (e.g., commands), from the system 120 to the device 110 to cause the device 110 to perform an action, such as output synthesized speech (responsive to the user input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, output content (e.g., music) via the loudspeaker(s) of (or otherwise associated with) the device 110, display content on a display of (or otherwise associated with) the device 110, and/or send a directive to a secondary device (e.g., a directive to turn on a smart light in communication with the device 110). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

A microphone or array of microphones (of or otherwise associated with a device 110) may capture audio 107. The device 110 processes the audio data 611, representing the audio 107, to determine whether speech is detected. The device 110 may use various techniques to determine whether the audio data 611 includes speech. In some examples, the device 110 may apply voice activity detection (VAD) techniques. Such techniques may determine whether speech is present in the audio data 611 based on various quantitative aspects of the audio data 611, such as the spectral slope between one or more frames of the audio data 611, the energy levels of the audio data 611 in one or more spectral bands, the signal-to-noise ratios of the audio data 611 in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data 611 to one or more acoustic models in storage, whether the acoustic models may include models corresponding to speech, noise (e.g., environmental noise or background noise), or silence. Still other techniques may be used to determine whether speech is present in the audio data 611.

Once speech is detected in the audio data 611 representing the audio 107, the device 110 may determine if the speech is directed at the device 110/system 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data 611, representing the audio 107, is analyzed to determine if specific characteristics of the audio data 611 match preconfigured acoustic waveforms, audio signatures, or other data corresponding to a wakeword.

Thus, the wakeword detection component 620 may compare the audio data 611 to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 620 detects a wakeword, the device 110 may "wake" and the wakeword detection component 620 may send an indication of such detection to a hybrid selector 624. In response to receiving the indication, the hybrid selector 624 may send the audio data 611 to the system 120 and/or an ASR component 650 implemented by the device 110. The wakeword detection component 620 may also send an indication, to the hybrid selector 624, representing a wakeword was not detected. In response to receiving such an indication, the hybrid selector 624 may refrain from sending the audio data 611 to the system 120, and may prevent the ASR component 650 from processing the audio data 611. In this situation, the audio data 611 can be discarded.

The device 110 may conduct its own speech processing using on-device language processing components (such as an on-device SLU component, the ASR component 650, and/or a NLU component 660) similar to the manner discussed above with respect to the system-implemented SLU component, ASR component 150, and NLU component 160. The device 110 may also internally include, or otherwise have access to, other components such as one or more skills (including the skill 125), a user recognition component 695 (configured to process in a similar manner to the user recognition component 195 implemented by the system 120), a profile storage 610 (configured to store similar profile data to the profile storage 170 implemented by the system 120), a TTS component 680 (configured to process in a similar manner to the TTS component implemented by the system 120), a domain selection component 672 (configured to process in a similar manner to the domain selection component 172 implemented by the system 120), a domain component 675 (configured to process in a similar manner to the domain component 175 implemented by the system 120), a skill invocation component 680 (configured to process in a similar manner to the skill invocation component 180 implemented by the system 120), a context aggregation component 635 (configured to process in a similar manner to the context aggregation component 135 implemented by the system 120), a personalization identifier component 640 (configured to process in a similar manner to the personalization identifier component 140 implemented by the system 120), a personalization identifier cache 645 (configured to store similar data to the personalization identifier cache 145 implemented by the system 120), a skill configuration storage 655 (configured to store similar data to the skill configuration storage 155 implemented by the system 120), a personalization identifier storage 665 (configured to store similar data to the personalization identifier storage 165 implemented by the system 120), a supplemental content component 685 (configured to processing in a similar manner to the supplemental content component 185 implemented by the system 120), and/or other components. In at least some embodiments, the storages of the device 110 may only store data for users specifically associated with the device 110.

In at least some embodiments, the on-device language processing components may not have the same capabilities as the language processing components implemented by the system 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the device 110 attempts to process a user input for which the on-device language processing components are not necessarily best suited, the one or more NLU hypotheses, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 611 to pass to the system 120 while also receiving (e.g., intercepting) this audio data 611 and sending the audio data 611 to the HEC 627.

In at least some embodiments, the hybrid selector 624 may further include a local request orchestrator (LRO) 628 configured to notify the ASR component 650 about the availability of the audio data 611, and to otherwise initiate the operations of on-device language processing when the audio data 611 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 611 is received, the HP 626 may allow the audio data 611 to pass through to the system 120 and the HP 626 may also input the audio data 611 to the ASR component 650 by routing the audio data 611 through the HEC 627 of the hybrid selector 624, whereby the LRO 628 notifies the ASR component 650 of the audio data 611. At this point, the hybrid selector 624 may wait for response data from either or both the system 120 and/or the on-device language processing components. However, the disclosure is not limited thereto, and in some examples the hybrid selector 624 may send the audio data 611 only to the ASR component 650 without departing from the disclosure. For example, the device 110 may process the audio data 611 on-device without sending the audio data 611 to the system 120.

The ASR component 650 is configured to receive the audio data 611 from the hybrid selector 624, and to recognize speech in the audio data 611, and the NLU component 660 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the NLU component 660) may be selected as usable to respond to a user input, and local response data may be sent to the hybrid selector 624, such as a "ReadyToExecute" response. The hybrid selector 624 may then determine whether to use directive data from the on-device components to respond to the user input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each user input. The device 110 may include the unique identifier when sending the audio data 611 to the system 120, and the response data from the system 120 may include the unique identifier to identify to which user input the response data corresponds.

In at least some embodiments, the device 110 may include one or more skills. The skill(s) installed on (or in communication with) the device 110 may include, without limitation, one or more smart home skills and/or a device control skill configured to control a second device(s), a music skill configured to output music, a navigation skill configured to output directions, a shopping skill configured to conduct an electronic purchase, and/or the like.

Figure 7:
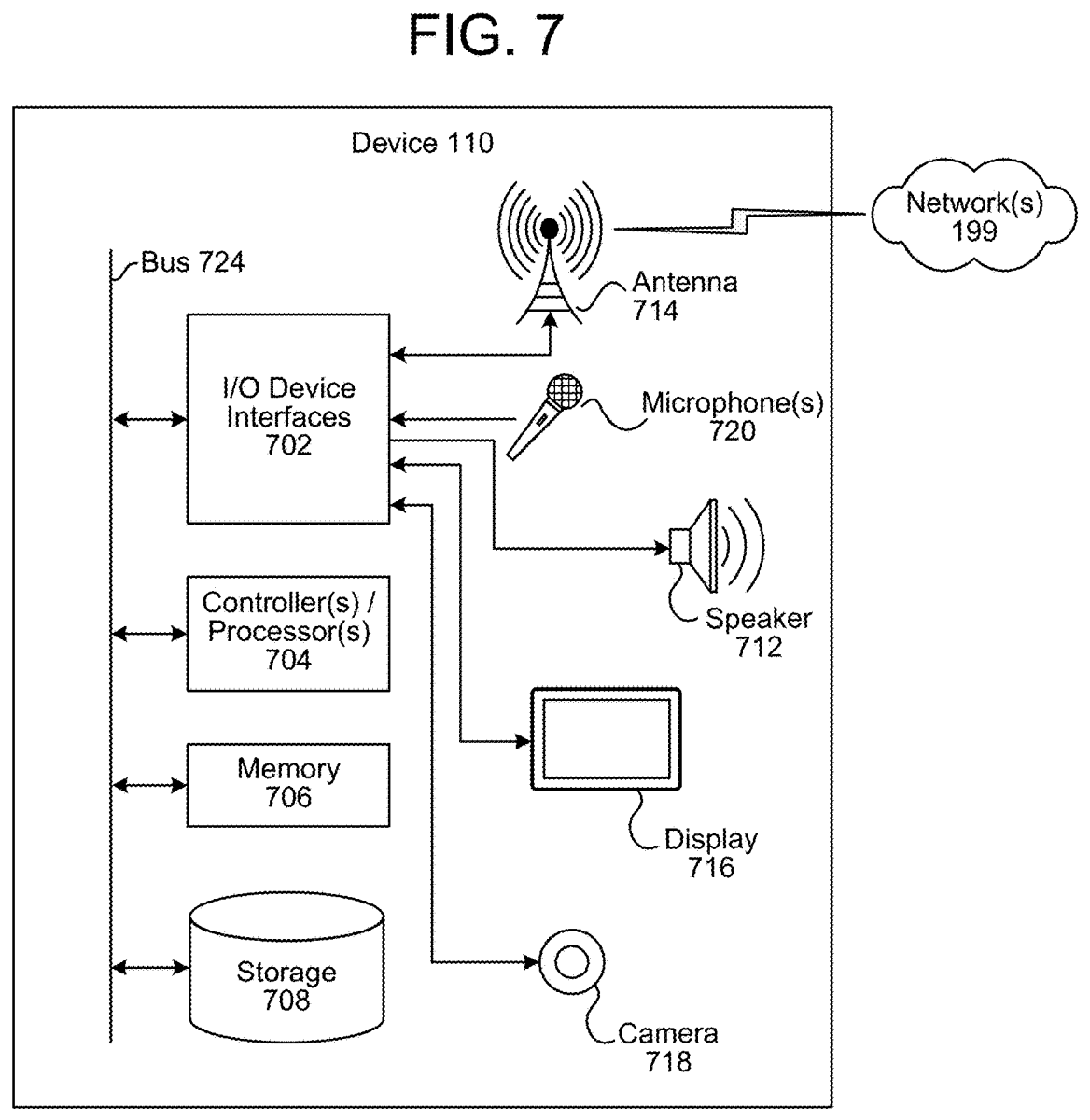
Figure 8:
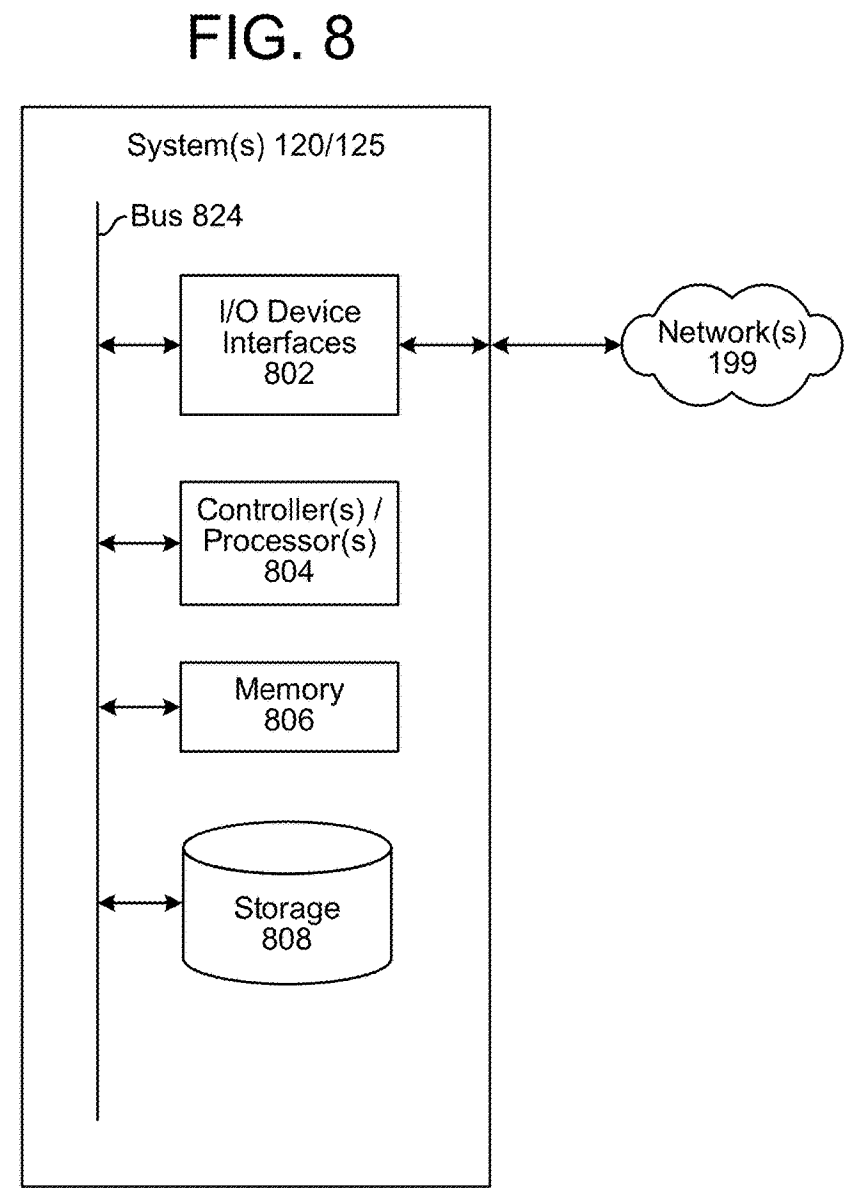

FIG. 7 is a block diagram conceptually illustrating a device 110 that may be used with the system 120. FIG. 8 is a block diagram conceptually illustrating example components of a remote device, such as the system 120, which may assist with ASR processing, NLU processing, etc.; and a skill 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skills 125, etc. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or a skill 125 may include their own dedicated processors, memory, and/or storage. Alternatively, one or more of the components of the device 110, the system 120, and/or a skill 125 may utilize the I/O interfaces (702/802), processor(s) (704/804), memory (706/806), and/or storage (708/808) of the device(s) 110, system 120, or the skill 125, respectively.

Thus, the ASR component XXA50 may have its own I/O interface(s), processor(s), memory, and/or storage; the NLU component XXA60 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill 125, as described herein, are illustrative, and may be located as a stand-alone device or may be included, in whole or in part, as a component of a larger device or system.

As illustrated in FIG. 9, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component XXA50, the NLU component XXA60, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving input audio data representing a user input;
performing speech processing using the input audio data to determine first data comprising a natural language representation of the user input;
processing the input audio data to determine second data representing first speech characteristics of the user input;
processing the second data with respect to third data representing second speech characteristics corresponding to a user profile;
based at least in part on processing the second data with respect to the third data, determining the user profile corresponds to the user input;
generating fourth data corresponding to the user input, the fourth data generated using the user profile;
sending, to a first component, the first data and the fourth data; and
receiving, from the first component, output data responsive to the user input, the output data configured based at least in part on the fourth data generated using the user profile.

2. The computer-implemented method of claim 1, further comprising:
determining fifth data representing an application programming interface (API) call,
wherein the output data includes the fifth data.

3. The computer-implemented method of claim 1, wherein the first component comprises at least one machine learning component configured to process natural language data.

4. The computer-implemented method of claim 1, further comprising:

determining, based at least in part on the user profile, that the first component is permitted to operate with respect to data corresponding to the user profile.

5. The computer-implemented method of claim 1, wherein the output data comprises output audio data representing synthesized speech.

6. The computer-implemented method of claim 1, further comprising:

receiving context data corresponding to the user input; and sending the context data to the first component, wherein the output data is configured further based at least in part on the context data.

7. The computer-implemented method of claim 6, wherein the context data represents a device corresponding to the user input.

8. The computer-implemented method of claim 1, further comprising:

determining an application enabled with respect to the user profile; and including, in the fourth data, an identifier of the application.

9. A system comprising:

at least one processor; and at least one memory comprising instructions that, when executed by the at least one processor, cause the system to:

receive input audio data representing a user input;

perform speech processing using the input audio data to determine first data comprising a natural language representation of the user input;

process the input audio data to determine second data representing first speech characteristics of the user input;

process the second data with respect to third data representing second speech characteristics corresponding to a user profile;

based at least in part on processing the second data with respect to the third data, determine the user profile corresponds to the user input;

generate fourth data corresponding to the user input, the fourth data generated using the user profile;

send, to a first component, the first data and the fourth data; and receive, from the first component, output data responsive to the user input, the output data configured based at least in part on the fourth data generated using the user profile.

10. The system of claim 9, wherein the at least one memory further comprises instructions that, when executed by the at least one processor, further cause the system to:

determine fifth data representing an application programming interface (API) call, wherein the output data includes the fifth data.

11. The system of claim 9, wherein the first component comprises at least one machine learning component configured to process natural language data.

12. The system of claim 9, wherein the at least one memory further comprises instructions that, when executed by the at least one processor, further cause the system to:

determine, based at least in part on the user profile, that the first component is permitted to operate with respect to data corresponding to the user profile.

13. The system of claim 9, wherein the output data comprises output audio data representing synthesized speech.

14. The system of claim 9, wherein the at least one memory further comprises instructions that, when executed by the at least one processor, further cause the system to:

receive context data corresponding to the user input; and send the context data to the first component, wherein the output data is configured further based at least in part on the context data.

15. The system of claim 14, wherein the context data represents a device corresponding to the user input.

16. The system of claim 9, wherein the at least one memory further comprises instructions that, when executed by the at least one processor, further cause the system to:

determine an application enabled with respect to the user profile; and include, in the fourth data, an identifier of the application.

* * * * *